United States Patent
Kokuryu

(10) Patent No.: US 8,023,361 B2
(45) Date of Patent: Sep. 20, 2011

(54) CLOCK PROVIDED WITH FUNCTION OF RAISING ALARM AT MORE THAN ONE TIME AND ALARMING METHOD

(75) Inventor: Mineto Kokuryu, Ikoma (JP)

(73) Assignee: Kyocera Corporation, Kyoto (JP)

( * ) Notice: Subject to any disclaimer, the term of this patent is extended or adjusted under 35 U.S.C. 154(b) by 16 days.

(21) Appl. No.: 12/059,737

(22) Filed: Mar. 31, 2008

(65) Prior Publication Data

US 2008/0239881 A1 Oct. 2, 2008

(30) Foreign Application Priority Data

Mar. 30, 2007 (JP) ................................. 2007-090898

(51) Int. Cl.
*G04B 23/06* (2006.01)
(52) U.S. Cl. ............... 368/74; 368/72; 368/73; 368/250
(58) Field of Classification Search .................... 368/74, 368/261, 72, 73
See application file for complete search history.

(56) References Cited

U.S. PATENT DOCUMENTS

| | | | | |
|---|---|---|---|---|
| 5,764,597 | A * | 6/1998 | Shih | 368/29 |
| 2004/0003061 | A1* | 1/2004 | Litwin et al. | 709/220 |
| 2004/0151076 | A1* | 8/2004 | Fidel | 368/251 |
| 2005/0058026 | A1* | 3/2005 | Hocherman | 368/73 |
| 2005/0190654 | A1* | 9/2005 | Patel | 368/73 |
| 2008/0129654 | A1* | 6/2008 | Bhavnani | 345/59 |

FOREIGN PATENT DOCUMENTS

JP 2005-038746 A 2/2005

\* cited by examiner

*Primary Examiner* — Renee Luebke
*Assistant Examiner* — Jason Collins
(74) *Attorney, Agent, or Firm* — Morrison & Foerster LLP

(57) ABSTRACT

In order to make it possible to set up an alarm method which is rich in variation, a mobile phone is configured so that a plurality of alarm times are related to the same group, the group to which a plurality of alarm times are related is set to activation or cancellation, and when there comes any one of a plurality of alarm times which are related to the group being set to activation, an alarm is raised. Since setting to raise an alarm at a plurality of alarm times, or cancellation of the setting can be made, an alarm method rich in variation can be configured.

10 Claims, 9 Drawing Sheets

FIG. 5

| ALARM NUMBER | ALARM NAME | ALARM TIME | GROUP |
|---|---|---|---|
| 1 | ALARM 1 | 7:00 | A |
| 2 | ALARM 2 | 7:15 | A |
| 3 | ALARM 3 | 7:30 | A |
| 4 | : | : | : |
| ⋮ | ⋮ | ⋮ | ⋮ |
| 10 | ALARM 10 | — | NONE |
| A | GROUP A | — | — |

FIG. 6

| ALARM NUMBER | ALARM IDENTIFICATION INFORMATION |
|---|---|
| WAKE-UP SETTING | SWITCH ON/OFF THE WAKE-UP SETTING |
| ALARM NAME | NAME OF THE ALARM |
| ALARM TIME | SET THE ALARM TIME |
| REPETITION | INSTRUCT REPETITION OF ALARM NOTIFICATION BY A DAY OF THE WEEK |
| ALARM SOUND | SET WAKE-UP SOUND |
| SNOOZE MODE | SET THE SNOOZE TIME WITHIN THE RANGE OF 1-10 MINUTES |
| ALARM SOUND VOLUME | ADJUST ALARM SOUND VOLUME |
| ALARM IMAGE | SELECT IMAGE TO BE DISPLAYED DURING NOTIFICATION |
| VIBRATOR | SELECT VIBRATION PATTERN |
| TIME READING ALOUD | SWITCH ON/OFF THE READING OF TIME BY AUDIO |
| PRIORITY SETTING | SELECT PRIORITY BETWEEN ALARM AND MANNER |

FIG. 7

GROUP TABLE

| ALARM NUMBER | GROUP NUMBER |
|---|---|
| 1 | A |
| 2 | A |
| 3 | A |
| 4 | NONE |
| : | : |
| : | : |
| : | : |
| 10 | NONE |

FIG. 8

GROUP FLAG TABLE

| ALARM NUMBER | RINGING UNAVAILABLE FLAG | FLAG IN GROUP ALARM |
|---|---|---|
| 1 | OFF | OFF |
| 2 | OFF | |
| 3 | OFF | |

FIG. 11A

IN THE MIDST OF GROUP ALARM

| ALARM NUMBER | RINGING UNAVAILABLE FLAG | FLAG IN GROUP ALARM |
|---|---|---|
| 1 | OFF | ON |
| 2 | OFF | |
| 3 | OFF | |

FIG. 11B

TIME OF CANCELLATION OF GROUP ALARM
(IN THE CASE OF WAKING UP IS AVAILABLE AT 7:00 AND
THE "CANCELLATION" KEY IS PRESSED FOR A LONG TIME)

| ALARM NUMBER | RINGING UNAVAILABLE FLAG | FLAG IN GROUP ALARM |
|---|---|---|
| 1 | OFF | ON |
| 2 | ON | |
| 3 | ON | |

FIG. 11C

TIME IN THE MIDST OF GROUP ALARM

| ALARM NUMBER | RINGING UNAVAILABLE FLAG | FLAG IN GROUP ALARM |
|---|---|---|
| 1 | OFF | ON |
| 2 | OFF | |
| 3 | ON | |

FIG. 11D

LAST TIME OF GROUP ALARM

| ALARM NUMBER | RINGING UNAVAILABLE FLAG | FLAG IN GROUP ALARM |
|---|---|---|
| 1 | OFF | OFF |
| 2 | OFF | |
| 3 | OFF | |

CLOCK PROVIDED WITH FUNCTION OF RAISING ALARM AT MORE THAN ONE TIME AND ALARMING METHOD

This application is based on Japanese Patent Application No. 2007-090898 filed with Japan Patent Office on Mar. 30, 2007, the entire content of which is hereby incorporated by reference.

BACKGROUND OF THE INVENTION

1. Field of the Invention

This invention relates to a clock and an alarming method, and more specifically, to a clock provided with a function of raising an alarm at a plurality of times and an alarming method executed by the clock.

2. Description of the Related Art

In recent years, mobile phones available in the market are provided with alarming function of, when setting up an alarm time, raising an alarm sound. Moreover, some mobile phones are provided with snooze alarming function of raising an alarm at a previously setup time interval after the alarm time. Furthermore, there is known a wake-up call setting method that makes it possible to alter the time interval in snooze alarming function while keeping the snooze alarming function valid. This wake-up call setting method comprises: a step of making a wake-up call ring; a step of, when a predetermined key is inputted during ringing of the wake-up call, reconfiguring a new wake-up call interval by using an input value of the key concerned and a basic time interval; and a step of making the wake-up call ring at said reconfigured wake-up call interval.

However, since the conventional wake-up call setting method has a single alarm method in regard to type of sound, and loudness of sound, etc., it can only repeat the same alarm method. For this reason, since all the methods of raising an alarm at different times are the same, there is a problem that the present time cannot be known unless a user counts the number of alarms or unless the user see a displayed time.

SUMMARY OF THE INVENTION

A clock and an alarming method in this embodiment can configure a variety of alarm settings.

Furthermore, the clock and the alarming method in the embodiment can improve operation performance.

The clock in this embodiment includes: a grouping portion to relate a plurality of alarm times to the same group, a setting portion to set up activation or cancellation on the group to which the plurality of alarm times are related by the grouping portion, and an alarming portion to raise an alarm when there comes any one of the plurality of alarm times which are related to the group being set to activation.

Another clock in this embodiment includes: a grouping portion to relate a plurality of alarm times to the same group; a group-halt-instruction accepting portion to accept a group halt instruction; a state switching portion to, when the group halt instruction is accepted after the earliest alarm time among the plurality of alarm times which are related to the group by the grouping portion, switch from a first state to a second state; and an alarming portion to, when there comes any one of the plurality of alarm times which are related to the group, raise an alarm on condition that the clock is set to the first state.

An alarming method in this embodiment includes the steps of: relating a plurality of alarm times to the same group; setting up activation or cancellation on the group to which the plurality of alarm times are related; and, when there comes any one of the plurality of alarm times which are related to the group being set to activation, raising an alarm.

Another alarming method in this embodiment includes the steps of: relating a plurality of alarm times to the same group; accepting the group halt instruction; when the group halt instruction is accepted after the earliest alarm time among the plurality of alarm times which are related to the group, switching from the first state to a second state; and, when there comes any one of the plurality of alarm times which are related to the group, raising an alarm on condition that the clock is set to the first state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an example of an alarm list screen.

FIG. 6 is a diagram showing a list of items which can be set up on an alarm setting screen.

FIG. 7 is a diagram showing an example of a group table.

FIG. 8 is a diagram showing an example of a group flag table.

FIGS. 11A to 11D are diagrams showing specific examples of the group flag table.

DESCRIPTION OF THE PREFERRED EMBODIMENTS

Figure 1:
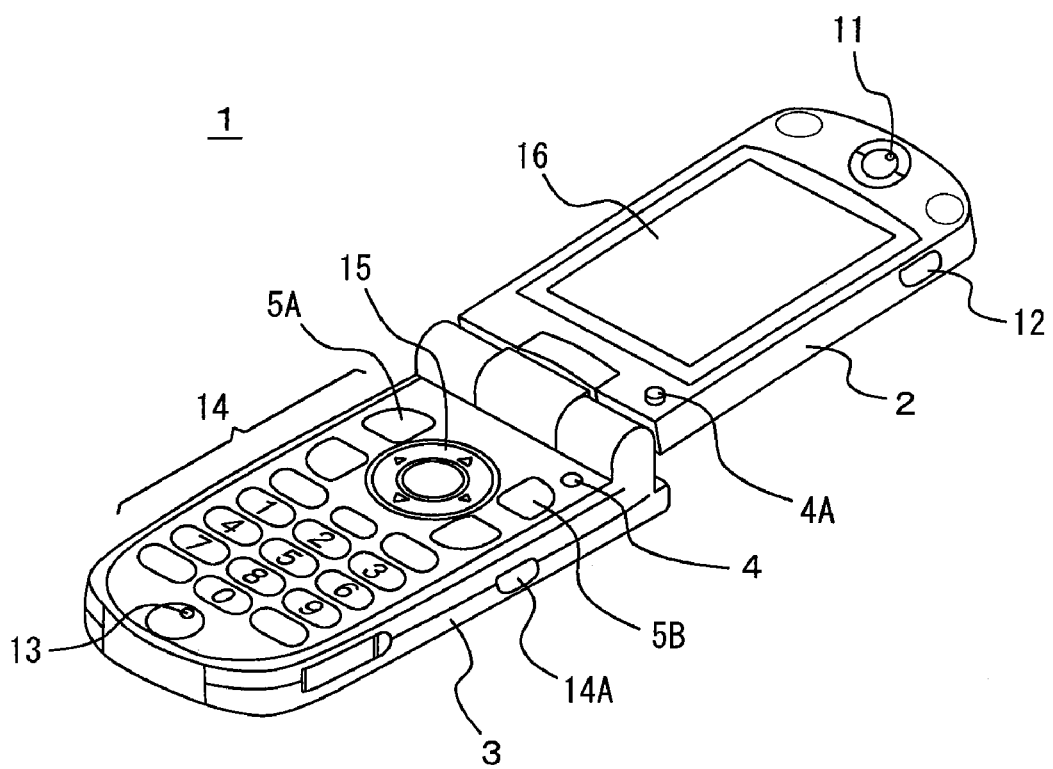
FIG. 1 is a perspective view showing an appearance of a mobile phone in an embodiment of the present invention.

Embodiments of the present invention will now be described with reference to the drawings. In the following description, like reference characters denote like parts, which have like names and functions, therefore, detailed description thereof will not be repeated.

FIG. 1 is a perspective view showing an appearance of a mobile phone in an embodiment of the present invention. Referring to FIG. 1, a mobile phone 1 includes operation side portion 3 and display side portion 2. On an internal surface of operation side portion 3, operation keys 14 including numerical keys, a speaking key, first soft-key 5A, second soft-key 5B, instruction keys 15, etc., a microphone 13, and open/close sensor 4 are arranged, and on an outer surface opposite to the internal surface, camera 24 (refer to FIG. 3), which will be described later, is arranged. Halt key 14A is arranged on the side of operation side portion 3. Halt key 14A is a button switch, and when pressed, it is set to ON.

On an internal surface of display side portion 2, liquid crystal display (LCD) 16 and first loudspeaker 11 are arranged. Moreover, second loudspeaker 12 is arranged on the side face of display side portion 2. While an example where mobile phone 1 is provided with LCD 16 is shown here, an organic EL (Electro Luminescence) display may be used instead of LCD 16.

Operation side portion 3 and display side portion 2 are joined to be rotated by a hinge mechanism, and operation side portion 3 and display side portion 2 can be opened and closed freely. A state of mobile phone 1 in which mobile phone 1 is folded, and operation side portion 3 and display side portion 2 are each in a close state is designated as a close style; a state of mobile phone 1 in which mobile phone 1 is opened, and operation side portion 3 and display side portion 2 are each in an open state is designated as an open style. Whether operation side portion 3 and display side portion 2 are in the open state or in the close state is detected by open/close sensor 4 mounted on operation side portion 3. Open/close sensor 4 is a pressure sensor, and becomes ON when pressed by projection part 4A of display side portion 2. Moreover, a proximity sensor such as a magnetic sensor can be used as open/close sensor 4.

Figure 2:
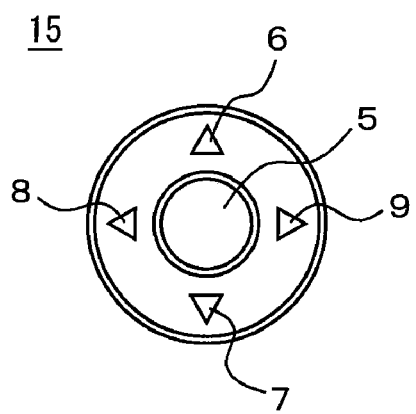
FIG. 2 is a diagram showing an arrangement of instruction keys provided by operation keys.

FIG. 2 is a diagram showing arrangement of instruction keys provided by operation keys have. Referring to FIG. 2, instruction keys 15 include determination key 5, up-arrow key 6, down-arrow key 7, left-arrow key 8, and right-arrow key 9. Determination key 5, up-arrow key 6, down-arrow key 7, left-arrow key 8, and right-arrow key 9 are button switches, and set to ON when pressed.

Figure 3:
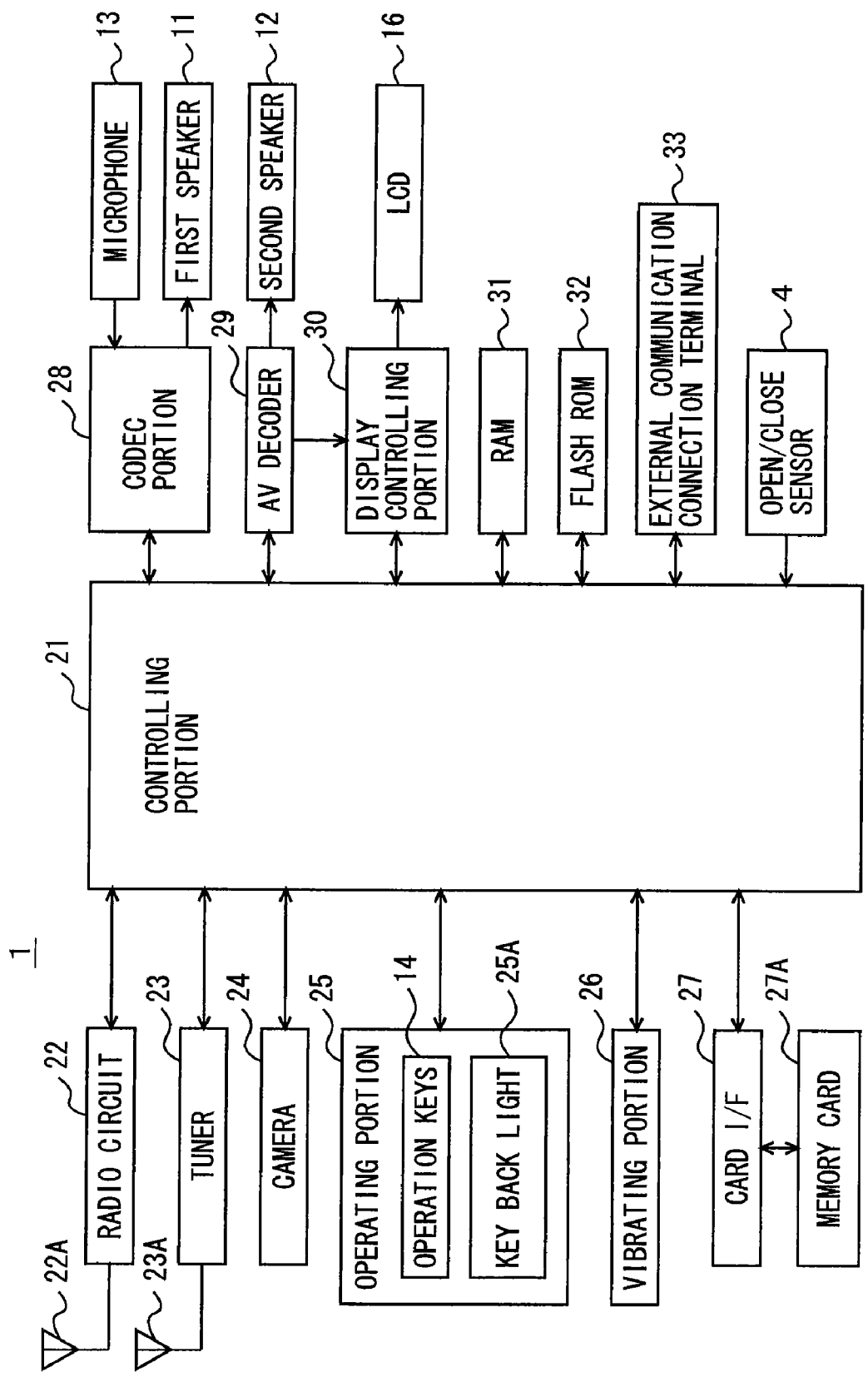
FIG. 3 is a functional block diagram showing an example of the outline of a function of the mobile phone.

FIG. 3 is a functional block diagram showing an example of the outline of functions of the mobile phone. Referring to FIG. 3, mobile phone 1 has: controlling portion 21 to control the whole of mobile phone 1; radio circuit 22 connected to antenna 22A; codec portion 28 to process voice data; microphone 13 and first loudspeaker 11 each connected to codec portion 28; tuner 23 connected to antenna 23A; AV decoder 29; camera 24; operating portion 25 to accept an input of an operation by a user; a display controlling portion 30 to control display of LCD 16; RAM (Random Access Memory) 31 used as a working area of controlling portion 21; flash ROM (Flash Read Only Memory) 32 to store a program and the like executed by controlling portion 21; vibrating portion 26; card interface (I/F) 27; external communication connection terminal 33 as a serial interface; and open/close sensor 4.

Radio circuit 22 accepts input of a radio signal received by antenna 22A and outputs a voice signal decoded from the radio signal to codec portion 28. Moreover, radio circuit 22 accepts input of a voice signal from codec portion 28 and outputs a radio signal modulated from the voice signal to antenna 22A. Codec portion 28 decodes the voice signal inputted from radio circuit 22, converts the decoded digital voice signal into an analog signal, amplifies it, and outputs it to first speaker 11. Moreover, codec portion 28 accepts input of an analog voice signal from microphone 13, converts the voice signal into a digital signal, encodes it, and outputs the coded voice signal to radio circuit 22.

Tuner 23 is connected to antenna 23A, and accepts input of a broadcast signal received by antenna 23A. The broadcast signal is a high frequency digital modulated signal including video data and voice data. Tuner 23 takes out a signal of a specific frequency from the high frequency digital modulated signal inputted from antenna 23A. Moreover, tuner 23 is provided with an inverse interleave circuit and an error correction circuit, decodes the high frequency digital modulated signal of a specific frequency that is taken out, and outputs code data to AV decoder 29. AV decoder 29 is provided with a video decoder and an audio decoder, decodes the code data inputted from tuner 23 to raise a video signal and a voice signal, outputs the video signal to display controlling portion 30, D/A converts the voice signal to analog data, and gives it to the second loud speaker 12. While the example where a broadcast radio wave of digital television broadcasting is received to be reproduced is shown, it may be configured to receive a broadcast radio wave of analog television broadcasting to be reproduced. Moreover, it may be configured to receive a broadcast radio wave of radio broadcasting to be reproduced instead of the television broadcasting or in addition to the television broadcasting.

Display controlling portion 30 is controlled by controlling portion 21, controls LCD 16 according to an instruction inputted from controlling portion 21 to enable LCD 16 to display an image. The image displayed on LCD 16 includes dynamic image and static image.

Camera 24 is provided with a lens and a photoelectric transducer such as a CMOS (Complementary Metal Oxide Semiconductor) sensor. Light focused by the lens is imaged on the CMOS sensor, and the CMOS sensor performs photoelectric conversion on the received light and outputs image data to controlling portion 21. Camera 24 is controlled by controlling portion 21, starts picking up image by an instruction from controlling portion 21, and outputs the obtained static image data or dynamic image data to controlling portion 21. Camera 24 is provided with an image processing circuit to perform image processing for improving image quality of the image data photoelectrically converted, and an A/D-conversion circuit to convert analog image data to digital data. Controlling portion 21 outputs the static image data or the dynamic image data outputted by camera 24 to display controlling portion 30, and enables LCD 16 to display the image. Alternately, controlling portion 21 encodes the static image data or the dynamic image data by a compression encoding system and stores it in flash ROM 32 or a memory card 27A mounted on card I/F 27. By this processing, an image content is recorded in memory card 27A.

Operating portion 25 includes operation keys 14 and key back light 25A. Operation keys 14 accept an input of an operation by a user, and output the accepted operation to controlling portion 21. Key back light 25A emits light by controlled by controlling portion 21.

Card I/F 27 is provided with removable memory card 27A. Memory card 27A may be, for example, CompactFlash, SmartMedia (registered trademark), SD (Secure Digital)/MiniSD/MicroSD memory cards, a memory stick, MMC (MultiMedia Card), an xD Picture card, etc.

Controlling portion 21 can access to memory card 27A through card I/F 27. In the case where memory card 27A stores an image content, controlling portion 21 reads the image content from memory card 27A, and outputs code data included in the image content to AV decoder 29. AV decoder 29 decodes the code data inputted from controlling portion 21, raises a video signal and a voice signal, outputs the video signal to display controlling portion 30, performs D/A conversion on the voice signal, and gives it to second speaker 12. By this processing, the image content is reproduced.

While an example where flash ROM 32 stores a program to be executed by controlling portion 21 will be described here, it is possible that the program is stored in memory card 27A, and controlling portion 21 is configured to read the program from memory card 27A and execute it. A recording medium to store the program is not restricted to memory card 27A. The following may be used: a flexible disk, cassette tape, an optical disk (CD-ROM (Compact Disc-ROM)/MO (Magnetic Optical Disc)/MD (Mini Disc)/DVD (Digital Versatile Disc)), semiconductor memories such as an optical card, mask ROM, and EPROM, and the like. Moreover, mobile phone 1 may be configured to be connected to the Internet through radio circuit 22, download a program from a computer connected to the Internet, and enable controlling portion 21 to execute it. The program, as used herein, is not only a program directly executable by controlling portion 21 but also includes source programs, compressed programs, encrypted programs, etc.

Figure 4:
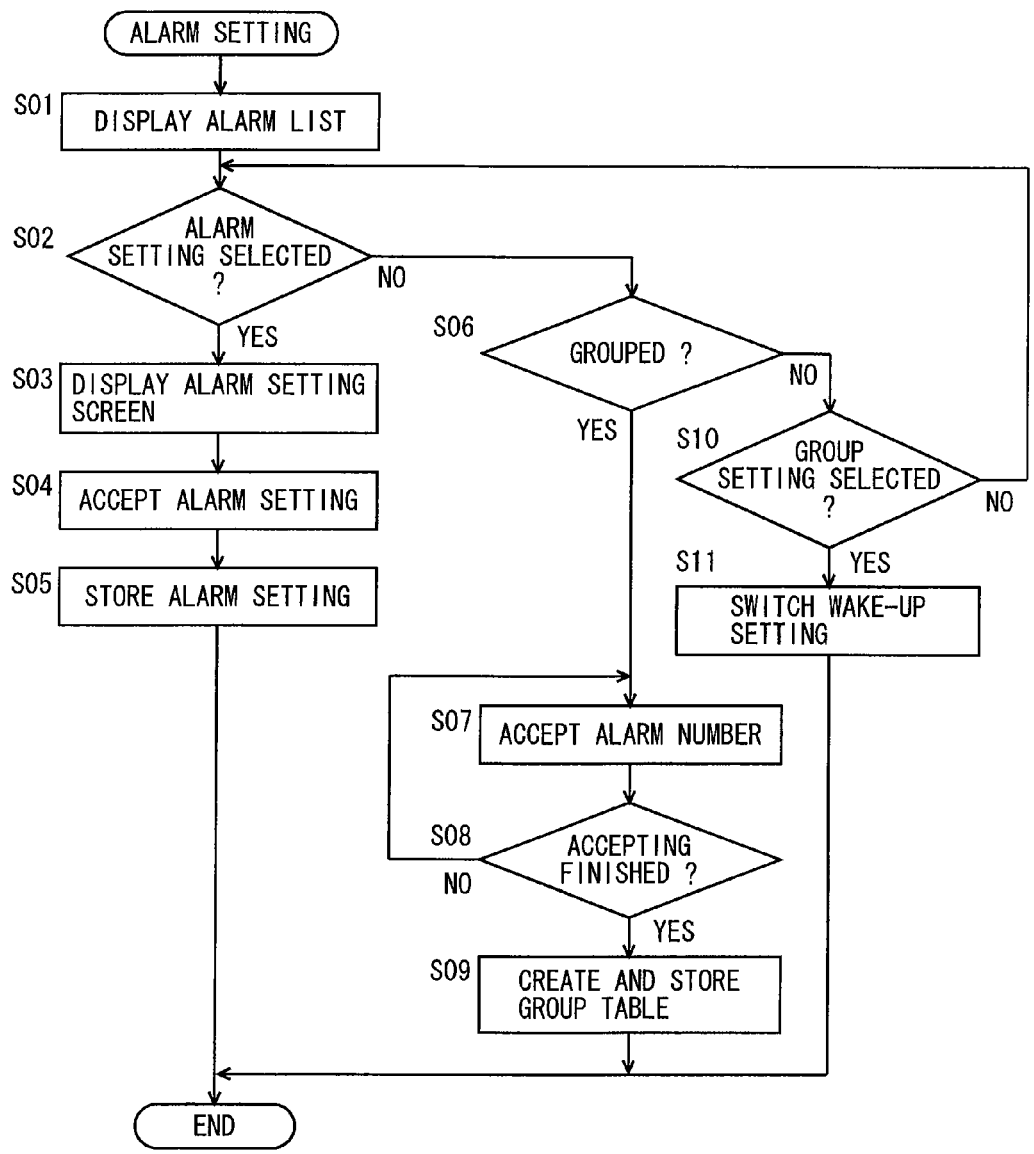
FIG. 4 is a flowchart showing an example of a flow of alarm setting processing.

Mobile phone 1 in this embodiment can configure a plurality of alarm settings. FIG. 4 is a flowchart showing an example of a flow of alarm setting processing. The alarm setting processing is a process executed by controlling portion 21 in response to an alarming program executed. Referring to FIG. 4, when a user instructs setup of an alarm on operation keys 14, controlling portion 21 accepts an instruction of list display of alarm settings, controls display controlling portion 30, and enables LCD 16 to display an alarm list screen (step S01). The alarm list screen is a screen to display alarm names of a plurality of alarms in the form of a list.

FIG. 5 is a diagram showing an example of an alarm list screen. Referring to FIG. 5, the alarm list screen is a screen to display a part of records of all the alarm settings and a part of records of all the group alarm settings. The alarm list screen shows items including the alarm number, alarm name, alarm time, and group of each record. The item of the alarm number shows the alarm number corresponding to each record of the alarm setting and the group number corresponding to a record of the group alarm setting. FIG. 5 shows an example where items of a part of records of the alarm setting in alarm numbers 1 to 10 and items of a part of records of the alarm setting in the group number "A" are displayed.

Referring back to FIG. 4, when the alarm list screen is displayed, controlling portion 21 judges whether an instruction to be selected one of records of the alarm setting displayed on the alarm list screen by a user is accepted (step S02). When one of the records of the alarm setting is accepted, the selected record of the alarm setting is determined as a processing object, and the processing proceeds to step S03. When the instruction to select the record of the alarm setting is not accepted, the processing proceeds to step S06.

In step S03, LCD 16 is made to display an alarm setting screen by controlling display controlling portion 30. The alarm setting screen is selected on the alarm list screen, and includes an area to set up various items of the record of the alarm setting determined as the processing object in step S02.

FIG. 6 is a diagram showing a list of items which can be set up on the alarm setting screen. Referring to FIG. 6, items which can be set up for each alarm setting includes wake-up setting, alarm name, alarm time, repetition, alarm sound, snooze mode, sound volume of alarm, alarm image, vibrator, time reading aloud, and priority setting. The item of the wake-up setting is an item to set up a determination as to whether the alarm setting is validated or invalidated. When the alarm is set to be valid, alarm processing, described later, is executed and an alarm is raised in accordance with the contents which are set up respectively to the items of the alarm setting.

The item of the alarm name is a name designated to the alarm setting. A user may designate any name. The item of the alarm time is an item to set up a time when the alarm is raised (the alarm sound is raised). The item of repetition of ringing the alarm is an item to set up a unit of how the ringing of the alarm is repeated. For example, a setting to repeat it every day or on a specified day of the week is possible.

The item of the alarm sound is an item to set up type of the alarm sound raised at the alarm time. The type of the alarm sound is specified from among sounds stored in flash ROM 32 in advance. When flash ROM 32 is configured to store a plurality of types of sounds, sounds which are different for the respective alarm setting can be set up as the alarm sounds. The item of the snooze mode is an item to set up switching between ON and OFF of a snooze function and a snooze duration. The snooze duration can be set up in a range from 1 to 10 minutes. The item of the sound volume of alarm is an item to set up the sound volume of the alarm sound raised. A different sound volume can be set up for each alarm setting.

The item of the alarm image is an item to specify an image to be displayed on LCD 16 at the alarm time. The image is specified from among images stored in flash ROM 32. Flash ROM 32 may be configured to store a plurality of kinds of image so that setting to display a different image on LCD 16 for each alarm setting can be made.

The item of the vibrator is an item to set up as to whether vibrating portion 26 is made to vibrate at the alarm time, and an item to set up as to select a pattern among a plurality of vibration patterns when the vibrator is made to vibrate. The item of the time reading aloud is an item to set up as to whether the alarm time is outputted with synthesized voice. The priority setting is an item to set up as to which is prioritized, either the alarm setting or a manner mode setting.

Referring back to FIG. 4, when the item of the alarm setting shown in FIG. 6 is inputted into operating portion 25 by a user according to the alarm setting screen, controlling portion 21 accepts content of each item of the inputted alarm setting (step S04). Then, controlling portion 21 stores in flash ROM 32 a record of the alarm setting which includes the contents of the accepted items (step S05), and the processing is completed.

While the alarm number is information to identify the alarm setting, the alarm name may be used as information to identify the alarm setting.

On the alarm setting with wake-up setting is set to ON, when the alarm time comes, the alarm sound and the vibration are raised in accordance with another content which is set up in the item of the alarm setting, and an image is displayed. Since each content can be set up for each of a plurality of alarm settings, such setting can be configured that a different alarm sound and a vibration pattern are raised for each of a plurality of alarm settings, and also that a different image is displayed for each alarm settings.

On the other hand, in step S06, controlling portion 21 judges whether the instruction by a user for grouping the alarm settings displayed on the alarm list screen is accepted. When the instruction for grouping is accepted, the processing proceeds to step S07; otherwise, the processing proceeds to step S10. For the instruction for grouping, a key to accept an instruction for grouping may be assigned to operation keys 14 in advance In step S07, specification of the alarm number is accepted. When a user inputs an instruction to select the alarm number of the alarm setting displayed on the alarm list screen by operating operation keys 14 of operating portion 25, the selected alarm number is accepted. Then, it is judged whether acceptance of the selection is finished (step S08). Upon detection of pressing of a key to accept completion of selecting that was assigned in advance to operation keys 14 of operating portion 25, it is judged that the acceptance of selection is finished. When acceptance of selection is finished, the processing proceeds to step S09; when it is not finished, the processing returns to step S07. This is for accepting selection of a plurality of alarm numbers.

In step S09, alarm settings of a plurality of alarm numbers accepted in step S07 are related to a single group. Specifically, a group table is created and is stored in flash memory 32. While a grouping is carried out by relating a plurality of alarm settings being set up, a plurality of alarm settings may be related by determining a group first and accepting the contents of items of a plurality of the alarm settings included in the group.

FIG. 7 is a diagram showing an example of a group table. Referring to FIG. 7, the group table includes the items of the alarm number and the items of the group number. The group table relates a group number to each alarm number. Here, an example where alarm settings of alarm numbers 1 to 3 are grouped to a group of group number A is shown. The alarm setting of the alarm number which is set to "none" for the item of the group number indicates a state of not being grouped.

Referring back to FIG. 4, controlling portion 21 judges in step S10 whether an instruction which was issued by a user to select the record of the group alarm setting displayed on the alarm list screen is accepted. When the instruction to select the record of the group alarm setting is accepted, the selected record of the group alarm setting is determined as the processing object, and the processing proceeds to step S11. When the instruction to select the record of the group alarm setting is not accepted, the processing returns to step S02. The record of the group alarm setting includes the item of wake-up setting. The item of wake-up setting is set to either ON or OFF. A default value is OFF.

By setting the wake-up setting of the group alarm to ON, alarms according to all the alarm settings included in the group alarm setting become valid. For this reason, it is not necessary to set the wake-up setting of a plurality of alarm settings to ON, and a plurality of alarm settings can be validated by an easy operation of setting the wake-up setting of the group alarm setting to ON. Moreover, since a plurality of alarm settings enable settings which are different in type of alarm sound, volume of the alarm sound, vibration pattern, and displayed image, various kinds of alarm settings can be validated by an easy operation of setting the wake-up setting of the group alarm setting to ON.

In step S11, the wake-up setting is switched and the processing is completed. Specifically, when the wake-up setting of the group alarm setting stored in flash ROM 32 is set to ON, the setting is rewritten to OFF; when it is set to OFF, it is rewritten to ON.

Mobile phone 1 in this embodiment switches the wake-up setting of a plurality of grouped alarm settings by switching the wake-up setting included in the record of the group alarm setting to either ON or OFF. In order to validate a plurality of alarm settings, when the wake-up setting in the group alarm setting is set to ON, mobile phone 1 creates a group flag table and stores it in flash ROM 32. Then, by referring to this group flag table, mobile phone 1 carries out an alarm operation based on a plurality of alarm settings related by the group table.

FIG. 8 is a diagram showing an example of the group flag table. Here, a case where the wake-up setting of the group alarm setting whose group name is "Group A" is set to ON is shown by way of example. Referring to FIG. 8, the group flag table includes the item of the alarm number, the item of a ringing unavailable flag, and the item of a flag in the group alarm. For the item of the ringing unavailable flag, either ON (a second state) or OFF (a first state) can be set up corresponding to each alarm number. The ringing unavailable flag is a flag to set up the alarm setting which corresponds to it to activation or inactivation. When it is set to ON, the alarm sound is prohibited to be raised even when there comes an alarm time which is set up in the corresponding alarm setting; when it is set to OFF, the alarm sound is raised when there comes an alarm time which is set up in the corresponding alarm setting. The default value of the ringing unavailable flag is OFF.

A single item of the flag in the group alarm is set up to all the alarm numbers belonging to Group A; in other words, a single item is set up corresponding to Group A, and can be set to either ON or OFF. Regarding the flag in the group alarm, in a period from the earliest time to the last time among a plurality of alarm times which are set up by the alarm setting belonging to Group A, the flag is set to ON, and in another period, the flag is set to OFF.

Figure 9:
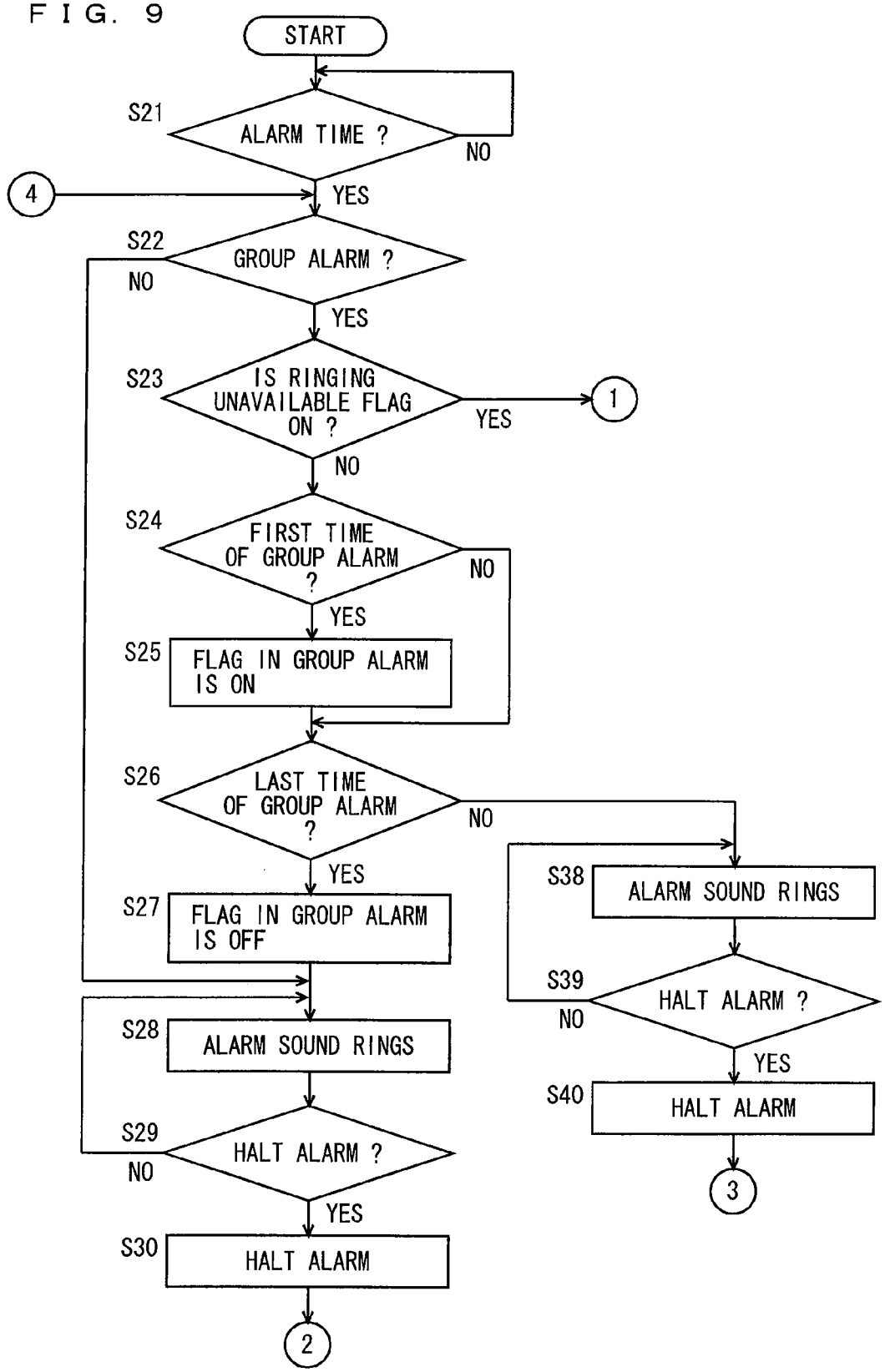
FIG. 9 is a first flowchart showing an example of a flow of alarm processing.
Figure 10:
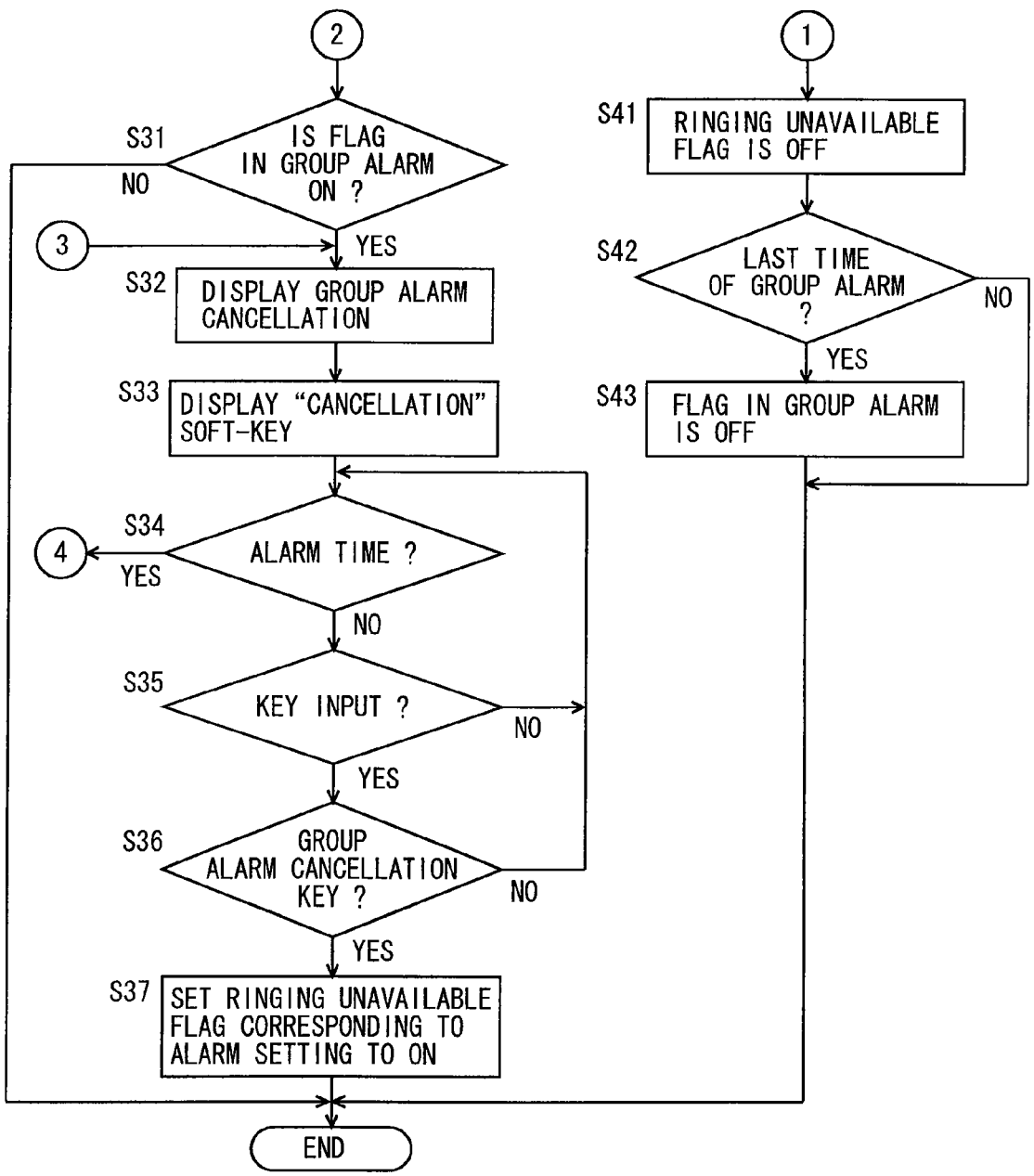
FIG. 10 is a second flowchart showing an example of a flow of the alarm processing.

FIGS. 9 and 10 are flowcharts showing an example of a flow of alarm processing. The alarm processing is processing executed by controlling portion 21 by executing the alarming program. This alarm processing is performed at a predetermined time interval, for example, 1-minute interval. Referring to FIGS. 9 and 10, controlling portion 21 first judges whether there comes the alarm time (step S21). Controlling portion 21 becomes a standby state until there comes the alarm time, and when there comes the alarm time, the processing proceeds to step S22. The alarm time is an alarm time included in the alarm setting wherein the items of the wake-up setting are set to ON. When there exists the group alarm setting wherein the items of the wake-up setting are set to ON, the alarm time is any one of the alarm times of all the alarm settings belonging to the group alarm setting.

In the next step S22, it is judged whether the alarm is the group alarm. Whether it is the group alarm is judged by the wake-up setting of the group alarm setting to which the alarm setting for which the alarm time has come belongs. When the alarm setting for which the alarm time has come belongs to any one of the groups and the wake-up setting of the group is set to ON, it is judged that the alarm is the group alarm. When it is the group alarm, the group flag table is updated and the processing proceeds to step S23. Hereafter, a case where the group alarm setting of the group number "A" is set to ON will be described by way of example. The group flag table in this stage is shown in FIG. 8. Referring to FIG. 8, all the ringing unavailable flags are set to OFF, and the flag in the group alarm is set to OFF.

Referring back to FIG. 9, in step S22, when it is judged that it is not the group alarm, the processing proceeds to step S28. When the processing proceeds to step S28, the processing is the same as that of the alarm processing based on independent alarm setting.

In step S23, it is judged whether a ringing unavailable flag is ON. In the group flag table, reference is made to the ringing unavailable flag corresponding to the alarm number of the alarm setting to which the alarm time corresponding to the current time is set. When the ringing unavailable flag is set to ON, the processing proceeds to step S41; when it is set to OFF, the processing proceeds to step S24. The ringing unavailable flag is set up so that its initial value is OFF, and in the later-described step S37, it is set to ON.

In step S24, it is judged whether the alarm time is the first-time alarm time in the group alarm. It is judged whether the alarm time is the earliest alarm time among the alarm times which are set up by a plurality of alarm settings included in the group alarm setting. When it is the first alarm time, the processing proceeds to step S25; when not, the processing is skipped over step S25 and proceeds to step S26. In step S25, the flag in the group alarms is set to ON, and the processing proceeds to step S26. FIG. 11A shows the group flag table in this stage.

In step S26, it is judged whether the alarm time is the final time of the group alarm. It is judged whether the alarm time is the last alarm time among alarm times which are set up by a plurality of alarm settings included in the group alarm. When the alarm time is the last alarm time, the processing proceeds to step S27; otherwise, the processing proceeds to step S38. In step S27, the flag in the group alarm is set to OFF, and the processing proceeds to step S28. FIG. 11D shows the group flag table in this stage.

In step S28, the alarm sound is raised in accordance with the alarm setting in which the current time is set to the alarm time. In the next step S29, it is judged whether the alarm halt instruction is accepted. When halt key 14A of operation keys 14 is pressed, controlling portion 21 receives the alarm halt instruction from operation keys 14. When the alarm halt instruction is accepted, the processing proceeds to step S30; when it is not accepted, the processing returns to step S28. In step S30, the ringing of the alarm sound is halted. The alarm sound continues to ring until a user presses halt key 14A.

In step S31, it is judged whether the flag in the group alarm is set to ON. When the flag in the group alarm is set to ON, the processing proceeds to step S32; when it is set to OFF, the processing is completed. When the flag in the group alarm is set to ON, the current time has not yet reached the alarm time which is set by any one of the alarm settings included in the group alarm setting, and therefore the processing is executed repeatedly. On the other hand, when the flag in the group alarm is set to OFF, the current time has passed all the alarm times which were set by the alarm settings included in the group alarm setting, and therefore the processing is completed. It may be possible to judge whether the current time is to pass the last alarm time being set up by the alarm setting included in the group alarm setting.

In step S32, group alarm cancellation is displayed; in step S33, a "cancellation" soft-key is displayed. Here, the group alarm cancellation screen including group alarm cancellation display and the "cancellation" soft-key is displayed on LCD 16.

Figure 12:
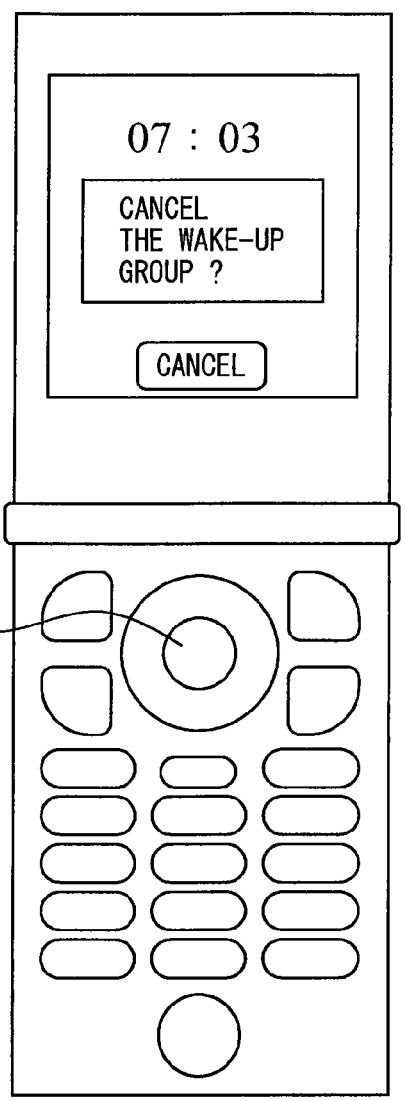
FIG. 12 is a diagram showing an example of a group alarm cancellation screen.

FIG. 12 is a diagram showing an example of the group alarm cancellation screen. Referring to FIG. 12, the group alarm cancellation screen includes a message of "Cancel the wake-up group?" as the group alarm cancellation display, and the soft-key to display a character of "cancellation." The soft-key is assigned to determination key 5 among the operation keys. When determination key 5 is pressed, an instruction to cancel the group alarm (a group halt instruction) is accepted.

Referring back to FIGS. 9 and 10, in step S34, it is judged whether the current time is the alarm time, as described in step S21. When the current time is the alarm time, the processing returns to step S22; otherwise, the processing proceeds to step S35. In step S35, it is judged whether the key input is accepted. When the key input is accepted, the processing proceeds to step S36; otherwise, the processing proceeds to step S34. In step S36, it is judged whether the accepted key is the group alarm cancellation key, determination key 5 in this case. When the input of determination key 5, as the group alarm cancellation key, is accepted, the processing proceeds to step S37; otherwise, the processing returns to step S34. That is, a standby state is maintained until the next alarm time comes, or until the input of the group alarm cancellation key is accepted.

In step S37, all the ringing unavailable flags corresponding to unreached alarm settings are set to ON (the second state), and the processing is completed. The unreached alarm setting is alarm setting wherein an alarm time which is after the current time among the alarm settings included in the group alarm is set up. For this reason, since the ringing unavailable flag is set to ON when there comes the time being set by the unreached alarm setting, it is possible not to make the alarm sound.

FIG. 11B shows the group flag table in a case where an input of the group alarm cancellation key is accepted at the time of 7:00 which is set up by the alarm setting of alarm number "1." Since the alarm time which is set by the alarm setting of alarm number "2" is 7:15 and the alarm time which is set by the alarm setting of alarm number "3" is 7:30, both are unreached alarm settings. Therefore, the ringing unavailable flag corresponding to the alarm number "2" and the ringing unavailable flag corresponding to alarm number "3" are both set to ON.

Referring to FIGS. 9 and 10, a case where the processing proceeds to step S38 is a case where the current time is an alarm time, and the alarm setting in which the alarm time is set up is not the last alarm time in the alarm group. In this case, in step S38, in accordance with the alarm setting wherein the current time is designated as the alarm time, the alarm sound is ring and the processing proceeds to step S39. In the next step S39, it is judged whether the alarm halt instruction is accepted. When any one of operation keys 14 is pressed, controlling portion 21 accepts the alarm halt instruction from operation keys 14. When the alarm halt instruction is accepted, the processing proceeds to step S40; when it is not accepted, the processing returns to step S38. In step S40, ringing of the alarm sound is halted and the processing proceeds to step S32. The alarm sound continues to ring until any one of operation keys 14 is pressed by a user.

On the other hand, a case where the processing proceeds to step S41 is a case where the ringing unavailable flag corresponding to the alarm setting wherein the current time becomes the alarm time is set to ON. In this case, the ringing unavailable flag is set to OFF and the processing proceeds to step S42. In the case where, in step S37, the ringing unavailable flag has once been set to ON, it is possible not to ring the alarm sound when there comes the alarm time which is set by the alarm setting corresponding to the ringing unavailable flag, and but to ring the alarm sound when there comes the alarm time next.

FIG. 11C is a diagram showing an example of the group flag table at the alarm time 7:15 which is set up by the alarm setting of alarm number "2" after the cancellation of the group alarm. Referring to FIG. 11C, the ringing unavailable flag corresponding to alarm number "2" is set to OFF.

Referring back to FIGS. 9 and 10, in step S42, it is judged whether the alarm time is the last alarm time among the group alarms. When the alarm time is the last alarm time, the processing proceeds to step S43; otherwise, step S43 is skipped, and the processing is completed. In step S43, the flag in the group alarm is set to OFF, and the processing is completed.

FIG. 11D is a diagram showing an example of the group flag table at the alarm time 7:30 being set up by the alarm setting of alarm number "3" after cancellation of the group alarm. Referring to FIG. 11D, the ringing unavailable flag corresponding to alarm number "3" is set to OFF, and the flag in the group alarm is set to OFF.

While the flag in the group alarm is used here, the flag in the group alarm is unnecessary when it is judged in step S31 whether the current time is between the earliest alarm time which is set up by a plurality of alarm settings included in the group alarm and the last alarm time.

As described in the above, mobile phone 1 in this embodiment can relate the plurality of alarm times to the same group by the group alarm setting, and to set the wake-up setting to ON or OFF for each group alarm setting. When the wake-up setting of the group alarm setting is set to ON, an alarm is to ring when there comes any one of a plurality of alarm times of a plurality of alarm settings included in the group alarm setting. A plurality of alarm settings which are related to the same group by the group alarm setting enable mutually different alarm sounds, sound volumes, vibration patterns, and outputted images to be set up. For this reason, since alarms based on a plurality of alarm settings can be to ring only by setting the wake-up setting of the group alarm setting to ON, the alarm method rich in variation can be set up by an easy operation.

Moreover, when an instruction to cancel the group alarm, as the input of determination key 5 here, is accepted after the earliest alarm time among a plurality of alarm settings included in the group alarm with the wake-up setting is set to ON, then the ringing unavailable flag corresponding to the alarm setting with an unreached alarm time is set to ON. It is possible to cancel an alarm setting not to ring among a plurality of alarm settings being set in the group alarm. As a result, operation performance can be improved.

Moreover, since when the ringing unavailable flag is set to ON, it is set to OFF after the current time passes the alarm time, the alarm can be raised when there comes the alarm time, and the setting of alarm time can be performed repeatedly.

Figure 13:
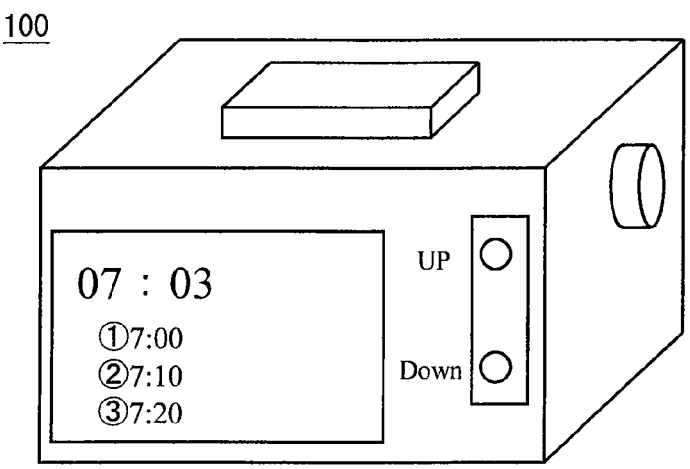
FIG. 13 is a perspective view showing an appearance of an alarm clock of a stand type.

While in this embodiment, as an example of a clock, mobile phone 1 is explained by way of example, the clock may be an alarm clock 100 of a stand alone type shown in FIG. 13.

While mobile phone 1 has been described in the above embodiment, the present invention may of course be understood as an alarming method or the alarming program for causing a computer execute the alarm processing shown in FIG. 4, FIG. 9, FIG. 10, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A clock in which plural alarm times can be set, the clock comprising:
    a grouping portion to relate a plurality of alarm times, selected from among said plural alarm times, to a same group;
    a setting portion to set up activation or cancellation for said group to which said plurality of alarm times are related by said grouping portion; and
    an alarming portion to raise an alarm when any one of said plurality of alarm times, which are related to said group being set up to be activated, arrives;
    a group-halt-instruction accepting portion to, after said alarming portion raises an alarm, judge whether to set up cancellation on said group being set up to be activated, and to display a group alarm cancellation screen configured to accept a group halt instruction; and
    a state switching portion to, when said group has been set to activation, set to a first state and to, when said group halt instruction has been accepted after the earliest alarm time among said plurality of alarm times being related to said group being set to activation, switch from said first state to a second state,
    wherein said alarming portion raises an alarm on condition that said first state is set.

2. The clock according to claim 1, wherein, said state switching portion switches to said first state when said second state is set after a current time passed an alarm time.

3. The clock according to claim 1, further comprising a halt-instruction accepting portion to accept an alarming halt instruction for halting the alarm,
    wherein said alarming portion halts the alarm in response to acceptance of said alarming halt instruction.

4. An alarming method comprising the steps of:
    relating a plurality of alarm times to a same group;
    setting up activation or cancellation on said same group to which said plurality of alarm times are related;
    raising an alarm when any one of said plurality of alarm times, which are related to said group being set to activation, arrives;
    after raising the alarm, judging whether to set up cancellation on said group being set to activation, and displaying a group alarm cancellation screen configured to accept a group halt instruction;
    setting to a first state when said same group is set to activation; and
    switching from said first state to a second state upon acceptance of said group halt instruction after the earliest alarm time among said plurality of alarm times being related to said group being set to activation,
    wherein said step of raising an alarm includes the step of raising an alarm on condition that said first state is set.

5. The alarming method according to claim 4, wherein said step of switching includes the step of switching to said first state when said second state is set after the current time passed an alarm time.

6. The alarming method according to claim 4, further comprising the step of accepting an alarming halt instruction for halting the alarm,
    wherein said alarming step includes the step of halting the alarm in response to acceptance of said alarming halt instruction.

7. An alarming method comprising the steps of:
    relating a plurality of alarm times to a same group;
    displaying a group alarm cancellation screen configured to accept a group halt instruction for, after raising an alarm, judging whether to set up cancellation on a group being set to activation, and;
    switching from a first state to a second state when said group halt instruction is accepted after an earliest alarm time among said plurality of alarm times being related to the group; and
    when any one of said plurality of alarm times, being related to the group, arrives, raising an alarm on condition that said first state is set.

8. The alarming method according to claim 7, further comprising the step of setting activation or cancellation on said group to which said plurality of alarm times are related,
    wherein when any one of said plurality of alarm times arrives, said step of raising the alarm includes the step of raising the alarm on condition that said group is set to activation.

9. The alarming method according to claim 8, wherein said step of switching the state includes the step of switching to said first state when said second state is set after said alarm time passed.

10. The alarming method according to claim 7, further comprising the step of accepting an alarming halt instruction to halt the alarm,
    wherein said step of raising the alarm includes the step of halting the alarm in response to acceptance of said alarming halt instruction.

* * * * *